United States Patent
Elbaz et al.

(10) Patent No.: US 9,652,529 B1
(45) Date of Patent: May 16, 2017

(54) METHODS AND SYSTEMS FOR AUGMENTING A TOKEN LEXICON

(75) Inventors: Gilad Israel Elbaz, Santa Monica, CA (US); Jacob Leon Mandelson, Pasadena, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/276,785

(22) Filed: Oct. 19, 2011

Related U.S. Application Data

(63) Continuation of application No. 10/954,714, filed on Sep. 30, 2004, now Pat. No. 8,051,096.

(51) Int. Cl.
  *G06F 17/30* (2006.01)

(52) U.S. Cl.
  CPC .. *G06F 17/30705* (2013.01); *G06F 17/30663* (2013.01)

(58) Field of Classification Search
  CPC ................................................. G06F 17/30289
  See application file for complete search history.

(56) References Cited

U.S. PATENT DOCUMENTS

| | | | | |
|---|---|---|---|---|
| 4,270,182 A | * | 5/1981 | Asija | .................................. 704/8 |
| 4,450,520 A |   | 5/1984 | Hollaar et al. | |
| 4,499,553 A | * | 2/1985 | Dickinson et al. | ............ 715/257 |
| 4,731,735 A | * | 3/1988 | Borgendale et al. | |
| 4,775,956 A | * | 10/1988 | Kaji et al. | ......................... 704/7 |
| 4,839,853 A |   | 6/1989 | Deerwester et al. | |
| 4,862,408 A | * | 8/1989 | Zamora | |
| 4,914,590 A | * | 4/1990 | Loatman et al. | ................. 704/8 |
| 4,972,349 A | * | 11/1990 | Kleinberger | |
| 5,099,426 A | * | 3/1992 | Carlgren et al. | ................... 704/9 |
| 5,224,038 A | * | 6/1993 | Bespalko | ...................... 715/234 |

(Continued)

FOREIGN PATENT DOCUMENTS

| | | |
|---|---|---|
| EP | 0621542 B1 | 10/1994 |
| EP | 1014276 A2 | 6/2000 |

(Continued)

OTHER PUBLICATIONS

A9.com>Company>What's New & Cool web page at http://a9.com/-/company/whatsCool.isp), as available via the Internet and printed on Jul. 29, 2004.

(Continued)

*Primary Examiner* — James Trujillo
*Assistant Examiner* — Hubert Cheung
(74) *Attorney, Agent, or Firm* — Fish & Richardson P.C.

(57) ABSTRACT

Methods and systems for augmenting a token lexicon are presented. In one embodiment, a method comprising identifying a first token from a search request, storing the first token in a lexicon data storage, receiving a character string comprising a second token, wherein the second token is substantially similar to the first token, and parsing the character string using the lexicon data storage to resolve the second token is set forth. According to another embodiment, a method comprising identifying a first token from an internet article, storing the first token in a lexicon data storage, receiving a character string comprising a second token, wherein the second token is substantially similar to the first token, and parsing the character string using the lexicon data storage to resolve the second token is set forth.

20 Claims, 2 Drawing Sheets

(56) References Cited

U.S. PATENT DOCUMENTS

| | | | |
|---|---|---|---|
| 5,261,112 A * | 11/1993 | Futatsugi | G06F 17/273 715/246 |
| 5,325,298 A | 6/1994 | Gallant | |
| 5,423,032 A | 6/1995 | Byrd et al. | |
| 5,454,046 A | 9/1995 | Carman, II | |
| 5,499,360 A | 3/1996 | Barbara et al. | |
| 5,619,709 A | 4/1997 | Caid et al. | |
| 5,682,539 A * | 10/1997 | Conrad et al. | 704/9 |
| 5,721,939 A | 2/1998 | Kaplan | |
| 5,778,363 A | 7/1998 | Light | |
| 5,778,364 A | 7/1998 | Nelson | |
| 5,845,278 A | 12/1998 | Kirsch et al. | |
| 5,873,081 A | 2/1999 | Harel | |
| 5,878,386 A | 3/1999 | Coughlin | |
| 5,890,103 A | 3/1999 | Carus | |
| 5,892,919 A * | 4/1999 | Nielsen | 709/228 |
| 5,907,680 A * | 5/1999 | Nielsen | 709/228 |
| 5,933,822 A | 8/1999 | Braden-Harder et al. | |
| 5,963,205 A | 10/1999 | Sotomayor | |
| 5,963,965 A | 10/1999 | Vogel | |
| 5,966,686 A | 10/1999 | Heidorn et al. | |
| 6,006,222 A | 12/1999 | Culliss | |
| 6,014,665 A | 1/2000 | Culliss | |
| 6,044,375 A | 3/2000 | Shmueli et al. | |
| 6,067,552 A | 5/2000 | Yu | |
| 6,076,051 A | 6/2000 | Messerly et al. | |
| 6,078,916 A | 6/2000 | Culliss | |
| 6,092,100 A * | 7/2000 | Berstis et al. | 709/203 |
| 6,119,164 A | 9/2000 | Basche | |
| 6,134,532 A | 10/2000 | Lazarus et al. | |
| 6,178,419 B1 | 1/2001 | Legh-Smith | |
| 6,182,068 B1 | 1/2001 | Culliss | |
| 6,185,559 B1 | 2/2001 | Brin et al. | |
| 6,230,168 B1 | 5/2001 | Unger et al. | |
| 6,233,575 B1 | 5/2001 | Agrawal et al. | |
| 6,269,189 B1 | 7/2001 | Chanod | |
| 6,269,361 B1 | 7/2001 | Davis et al. | |
| 6,272,456 B1 | 8/2001 | de Campos | |
| 6,285,999 B1 | 9/2001 | Page | |
| 6,289,342 B1 | 9/2001 | Lawrence et al. | |
| 6,289,353 B1 | 9/2001 | Hazlehurst et al. | |
| 6,298,348 B1 | 10/2001 | Eldering | |
| 6,314,419 B1 | 11/2001 | Faisal | |
| 6,324,519 B1 | 11/2001 | Eldering | |
| 6,334,131 B2 | 12/2001 | Chakrabarti et al. | |
| 6,421,675 B1 | 7/2002 | Ryan et al. | |
| 6,453,315 B1 | 9/2002 | Weissman et al. | |
| 6,460,029 B1 * | 10/2002 | Fries et al. | |
| 6,493,702 B1 | 12/2002 | Adar et al. | |
| 6,513,031 B1 * | 1/2003 | Fries et al. | |
| 6,526,440 B1 | 2/2003 | Bharat | |
| 6,529,903 B2 | 3/2003 | Smith et al. | |
| 6,542,401 B2 | 4/2003 | Yamauchi et al. | |
| 6,601,059 B1 * | 7/2003 | Fries | |
| 6,615,209 B1 | 9/2003 | Gomes et al. | |
| 6,640,006 B2 | 10/2003 | Wu et al. | |
| 6,658,423 B1 | 12/2003 | Pugh et al. | |
| 6,665,681 B1 | 12/2003 | Vogel | |
| 6,678,409 B1 | 1/2004 | Wu et al. | |
| 6,678,681 B1 | 1/2004 | Brin | |
| 6,714,939 B2 | 3/2004 | Saldanha et al. | |
| 6,725,259 B1 | 4/2004 | Bharat | |
| 6,738,764 B2 | 5/2004 | Mao et al. | |
| 6,754,873 B1 | 6/2004 | Law et al. | |
| 6,766,320 B1 | 7/2004 | Wang et al. | |
| 6,768,991 B2 | 7/2004 | Hearnden | |
| 6,810,375 B1 | 10/2004 | Ejerhed | |
| 6,816,857 B1 | 11/2004 | Weissman et al. | |
| 6,826,559 B1 | 11/2004 | Ponte | |
| 6,895,407 B2 * | 5/2005 | Romer et al. | 348/722 |
| 6,910,003 B1 | 6/2005 | Arnold et al. | |
| 6,922,691 B2 * | 7/2005 | Flank | |
| 6,941,294 B2 * | 9/2005 | Flank | 707/742 |
| 6,944,611 B2 * | 9/2005 | Flank et al. | |
| 6,968,308 B1 | 11/2005 | Brockett et al. | |
| 6,990,442 B1 * | 1/2006 | Davis | G06F 17/277 704/256 |
| 7,107,218 B1 | 9/2006 | Preston | |
| 7,107,524 B2 * | 9/2006 | Lin et al. | 715/234 |
| 7,194,460 B2 * | 3/2007 | Komamura | |
| 7,254,774 B2 | 8/2007 | Cucerzan et al. | |
| 7,296,019 B1 * | 11/2007 | Chandrasekar et al. | |
| 7,409,334 B1 | 8/2008 | Shoemaker | |
| 7,424,421 B2 | 9/2008 | Okumura | |
| 7,440,941 B1 * | 10/2008 | Borkovsky et al. | |
| 7,499,914 B2 | 3/2009 | Diab et al. | |
| 7,519,590 B2 * | 4/2009 | Chandrasekar et al. | |
| 7,672,927 B1 * | 3/2010 | Borkovsky et al. | 707/999.003 |
| 7,698,341 B2 | 4/2010 | Rubendall | |
| 7,747,633 B2 | 6/2010 | Kadiyska et al. | |
| 7,761,458 B1 | 7/2010 | Eshghi et al. | |
| 7,792,814 B2 | 9/2010 | Cohen | |
| 7,917,480 B2 | 3/2011 | Dean et al. | |
| 2002/0002450 A1 | 1/2002 | Nunberg et al. | |
| 2002/0002452 A1 | 1/2002 | Christy et al. | |
| 2002/0042791 A1 | 4/2002 | Smith et al. | |
| 2002/0059221 A1 | 5/2002 | Whitehead et al. | |
| 2002/0099700 A1 | 7/2002 | Li | |
| 2002/0123988 A1 | 9/2002 | Dean et al. | |
| 2002/0133481 A1 | 9/2002 | Smith et al. | |
| 2002/0165849 A1 | 11/2002 | Singh et al. | |
| 2002/0194197 A1 * | 12/2002 | Flank | 707/104.1 |
| 2003/0023425 A1 * | 1/2003 | Pentheroudakis | G06F 17/2725 704/9 |
| 2003/0069880 A1 * | 4/2003 | Harrison et al. | 707/3 |
| 2003/0084041 A1 * | 5/2003 | Dettinger | 707/5 |
| 2003/0120640 A1 * | 6/2003 | Ohta et al. | 707/3 |
| 2003/0126235 A1 | 7/2003 | Chandrasekar et al. | |
| 2003/0200198 A1 * | 10/2003 | Chandrasekar et al. | 707/1 |
| 2003/0212649 A1 * | 11/2003 | Denesuk et al. | 707/1 |
| 2003/0212675 A1 * | 11/2003 | Denesuk et al. | 707/5 |
| 2003/0217052 A1 * | 11/2003 | Rubenczyk et al. | 707/3 |
| 2004/0019697 A1 * | 1/2004 | Rose | 709/245 |
| 2004/0024752 A1 | 2/2004 | Manber et al. | |
| 2004/0059708 A1 | 3/2004 | Dean et al. | |
| 2004/0107195 A1 | 6/2004 | Trepess | |
| 2004/0119740 A1 | 6/2004 | Chang et al. | |
| 2004/0122811 A1 | 6/2004 | Page | |
| 2004/0123237 A1 * | 6/2004 | Lin et al. | 715/513 |
| 2004/0186705 A1 * | 9/2004 | Morgan | G06F 17/241 704/9 |
| 2004/0225497 A1 | 11/2004 | Callahan | |
| 2005/0055365 A1 | 3/2005 | Ramakrishnan et al. | |
| 2005/0080775 A1 * | 4/2005 | Colledge et al. | 707/3 |
| 2005/0086065 A1 | 4/2005 | Maion et al. | |
| 2005/0086205 A1 | 4/2005 | Franciosa et al. | |
| 2005/0131872 A1 * | 6/2005 | Calbucci et al. | 707/3 |
| 2005/0177582 A1 * | 8/2005 | Baird-Smith et al. | 707/100 |
| 2005/0210383 A1 * | 9/2005 | Cucerzan et al. | 715/533 |
| 2005/0228780 A1 | 10/2005 | Diab et al. | |
| 2005/0228797 A1 | 10/2005 | Koningstein et al. | |
| 2005/0283473 A1 | 12/2005 | Rousso et al. | |
| 2006/0036593 A1 | 2/2006 | Dean et al. | |
| 2007/0118356 A1 | 5/2007 | Badino | |
| 2007/0136067 A1 * | 6/2007 | Scholl | 704/270 |
| 2007/0174041 A1 * | 7/2007 | Yeske | 704/3 |
| 2008/0059607 A1 | 3/2008 | Schneider | |
| 2009/0157642 A1 | 6/2009 | Diab et al. | |

FOREIGN PATENT DOCUMENTS

| | | |
|---|---|---|
| EP | 1160686 | 12/2001 |
| WO | WO 00/79436 | 12/2000 |

OTHER PUBLICATIONS

An Annotea Bookmark Schema web page at http://www.w3.org/2003/07/Annotea/BookmarkSchema-200300707, as available via the Internet and printed on Sep. 28, 2003.

Annotea: An Open RDF Infrastructure for Shared Web Annotations web page at http://www.w3.org/2001/Annotea/Papers/www10/an-

(56) References Cited

OTHER PUBLICATIONS notea-www10html, as available via the Internet and printed on Sep. 28, 2003.
Applied Semantics News Series, pp. 1-4, brochure, no date.
Applied Semantics, Applied Semantics Launches Contextual Targeting Pay-For-Performance Ad Service Solution, Applied Semantics—Press Release, Oct. 21, 2002, pp. 1-2, web page at http://www.appliedsemantics.com/ne/ne_pr_081302.html as available via the Internet and printed on Aug. 18, 2003.
Applied Semantics, Inc.—Press Release, Applied Semantics Launches News Series to Power Publishing, page at http://www.appliedsemantics.com/ne/ne_pr_102102.html as available via the Internet and printed on Aug. 18, 2003.
Barrett, R. et al., How to Personalize the Web, Proceedings of the ACM Conference on Human Factors in Computing Systems, 1997.
Barroso et al., Web Search for a Planet: The Google Cluster Architecture, IEEE Computer Society, 2003, pp. 22-28.
Bharat, K. SearchPad: Explicit Capture of Search Context to Support Web Search, web page at http://www9.org/w9cdrom/173/173.html as available via the Internet and printed on Sep. 28, 2003.
Bk2site web page at http://bk2site.sourceforge.net/ as available via the Internet and printed on Sep. 28, 2003.
BlinkPro: Powerful Bookmark Manager: web page at http://www.blinkpro.com/, as available via the Internet and printed on Sep. 28, 2003.
Bookmark Tracker.com web page at http://www.bookmrktracker.com/, as available via the Internet and printed on Sep. 28, 2003.
Brin, S. et al., The Anatomy of a Large-Scale Hypertextual Web Search Engine,: 1998, Computer Science Department, Stanford University, Stanford, CA.
Chang, Chia-Hui et al., IEPAD: Information Extraction Based on Pattern Discovery, 2001, Dept. of Computer Science and Information Engineering, National Central University, Chung-Li, Taiwan.
Chi et al., Context Query in Information Retrieval, Proceedings of the 14$^{th}$ IEEE International Conference on Tools with Artificial Intelligence, IEEE Comp. Soc. vol. Conf. 14 Nov. 2002, pp. 101-106.
CIRCA Technology Overview, Applied Semantics White Paper, Jul. 2001, pp. 1-10.
Conerva—Products: Retrieval Ware, RetrievalWare—Optimized Search Precision & Recall web page at http://www.convera.com/products/nw_precisions.asp as available via the Internet and printed on Oct. 30, 2003.
Crescenzi, V., et al., RoadRunner: Towards Automatic Date Extraction from Large Web Sites, Proceedings of the 27$^{th}$ VLDB Conference, 2001, Rome, Italy.
Czyowicz, J. et al., Evaluation of Hotlinks Assignment Heuristics for Improving Web Access, Second Int'l Conference on Internet Computing (IC'01), vol. 2, Jun. 25-28, 2001, pp. 793-799, Las Vegas, Nevada, CSREA Press.
Delort, J. et al., Enhanced Web Document Summarization Using Hyperlinks, Hypo Tube'03, Aug. 26-30, 2003, Nottingham, United Kingdom.
Denoue, L. et al., An annotation tool for Web browsers and its application to information retrieval, Syscom University de Savoie, France.
Fellbaum, C. ed. WorldNet: An Electronic Lexical Database, Cambridge: The MIT Press, Mar. 1998, pp. 117-127, 285-303, P325. 5d38w67 1998.
Freitag, D., et al., Boosted Wrapper Induction, 2000, American Association for Artificial Intelligence.
FurlBeta What is Furl web page at http://www.furl.net/leranMore.jsp, as available via the Internet and printed on Jul. 29, 2004.
Geller, M. Quigo Signes Deal with Overture:, MediaDailyNews, Aug. 13, 2003 web page at http://www.mediapost.com/dtis_dsp_news.cfm?NewsID=215196 available via the Internet and printed on Sep. 21, 2004.
Google, News Results for Search Engines, web page at http://www.google.com/search?hl=en&i.e.,=UTF-8&q=search+engines, as available via the Internet and printed on Jul. 26, 2004.

Grefenstette, Gregory, Comparing Two Language Identification Schemes, Int'l Conference on Statistical Analysis of Textural Data, Dec. 11, 1995.
Hsu, C. et al., Generating Finite-State Transducers for Semi-Structured Data Extraction from the Web, Information Systems, 1998, pp. 521-538, vol. 23, No. 8, Elsevier Science Ltd., Great Britain.
iKeepBookmarks.com—A web-Based Bookmark Manager web page at http://www.ikeepbookmarks.com/ as available via the Internet and printed on Sep. 28, 2003.
Kaasten, S. et al., Designing an Integrated Bookmark/History System for Web Browsing, History Keeping in Computer Applications: A workshop, held at Human-Computer Interaction Laboratory, University of Maryland, Maryland, Dec. 2, 1999.
Kaasten, S. et al., Designing an Integrated Bookmark/History System for Web Browsing, Proceedings of the Western Computer Graphics Symposium, Mar. 26-29, 2000.
Kaasten, S. et al., How People Recognize Previously Seen WWW Pages from Tiles, URLs and Thumbnails in X. Faulkner, J. Finlay, F. Detienne (Eds.) People and Computers XVI (Proceedings of Human Computer Interaction 2002) BCS Conference Series, 247-265, Spriger Verlag at web page http://www.cpsc.ucalgary.ca/grouplab/papers/200202-ThumbnailStudy.BHCI/abstract.html, as available via the Internet and printed on Jul. 29, 2004.
Kaasten, S. et al., Integrating Back, History and Bookmarks in Web Browsers, In Extended Abstracts of the ACM Conference of Human Factors in Computing Systems (Chi'01), 2000.
Koll, M.B. Information Retrieval Theory and Design Based on a Model of the User's Concept Relations, Proceedings of the 3$^{rd}$ Annual Conference on Research and Development in Information Retrieval, 1980, pp. 77-93.
Kushmerick, N. et al., Adaptive information extraction: Core technologies for information agents,: 2002, Computer Sciences Debarment, University College Dublin.
Kushmerick, N. Wrapper induction: Efficiency and expressiveness,: Artificial Intelligence 2000, pp. 15-68, 118, Elsevier Science B.V.
Kushmerick, N., Finite-state approaches to Web information extraction, 2002, Computer Sciences Debarment, University College Dublin.
Laender, A. et al., A Brief Survey of Web Data Extraction Tools, 2002, Department of Computer Science, Federal University of Minas Gerais, Belo Horizonte MG Brazil.
Li, W., et al., PowerBookmarks: A System for Personalizable Web Information Organization, Sharing and Management, Sigmod Conference 1999, pp. 565-567.
Maarek, Y., et al., Automatically Organizing Bookmarks per contents, 5$^{th}$ Int'l World Wide Web Conference, Paris, France, May 6-10, 1996 a web page http://www.5conf.inria.fr/fich_html/ppaers/P37/Overview.html, as available via the Internet and printed on Sep. 28, 2003.
Middleton, S. et al., Capturing Knowledge of User Preferences: Ontologies in Recommender System, Proceeding of the 1$^{st}$ Int'l Conference on Knowledge Capture (K-CAP), Oct. 2001.
Muslea, I., et al., Hierarchical Wrapper Induction for Semistructured Information Sources, 1999, pp. 1-27, Kluwer Academic Publishers, the Netherlands.
Ontology Usage and Applications, Applied Semantics Technical White Paper, Jul. 2001, pp. 1-15.
Oztekin, U. et al., Usage Meets Link Analysis: Towards Improving Site Specific and Intranet Search via Usage Statistics. Technical Report, Department of Computer Science and Engineering, University of Minnesota, May 24, 2004.
Powerful Revenue Solutions of Online Publishers, Applied Semantics AdSense, pp. 1-2, brochure, no date.
RSS 1.0 channel for bookmark sharing. From Dan Brickleyon on Jan. 29, 2001 web page at http://lists.w3.org/Archives/Public/www-annotatin/2001Jan.Jun/0002.html, as available via the Internet and printed on Sep. 28, 2003.
Save This Homepage Gourmet the Magazine for good Living web page at http://www.savethis.clickability.com/saveThisApp?clickMap=displayHelp&helpID=0 as available via the Internet and printed on Sep. 28, 2003.

(56) References Cited

OTHER PUBLICATIONS

Staab, S., et al., An Annotation Framework for the Semantic Web, Proceedings of the 1st Int'l Workshop on Multimedia Annotation, Tokyo, Japan, Jan. 30-31, 2001.
Sullivan, D. AlmondNet Debuts Post-Search Behavioral Ad Network web page at http://searchenginwatch.com/searchday/article.php/3464811 as available via the Internet and printed on Feb. 10, 2005.
Tauscher L. et al., Revisitation Patterns in World Wide Web Navigations, ACM SIGCHI '97, Proceedings of the Conference on Human Factors in Computing Systems, held in Atlanta, George, Mar. 22-27, ACM Press.
Tengi, R.I. Design and Implementation of the WorldNet Lexical Database and Searching Software, in WorldNet: An electronic Lexical Data Base, Fellbaum, C. ed., Cambridge: The MIT Press 1998, 105-127.
Terveen, L. et al., A System for Sharing Recommendations, Communication of the ACM, vol. 40, No. 3, Mar. 1997.
TinyURL.com—where tiny is better: web page at http://tinuURL.com, as available via the Internet and printed on Nov. 11, 2003.
Verity Introduces Customizable Industry and Enterprise Taxonomies, Verity, Nov. 17, 2003, pp. 1-2.
Voorhees, E.M., Query Expansion Using Lexical-Semantic Relations, Proceedings to the 17th Annual ACM Conference on Research and Development in Information Retrieval, Aug. 1994, pp. 61-69.
washingtonpost.com, Marking a New Tool for Surfers web page at http://www.washingtonpost.com/ac2/wp-dyn/A132-2000Sep13?languate=printer, as available via the Internet and printed on Sep. 28, 2003.
White, M. et al., Multidocument Summarization via Information Extraction, First Int'l Conference on Human Language Technology Research (HLT) 2001.
Zhongjian, Wang et al., "A Word Segmentation Method with Dynamic Adapting to Text Using Inductive Learning," Association for Computational Linguistics, 2002, pp. 1-5.
ZNAIL—for easier living in a virtual world web page at http://www.znail.com/, as available via the Internet and printed on Sep. 28, 2003.
International Search Report & Written Opinion for Application No. PCT/US2005/035010, dated May 16, 2006, 15 pages.
Office Action issued in U.S. Appl. No. 10/954,714 on Feb. 2, 2007, 25 pages.
Office Action issued in U.S. Appl. No. 10/954,714 on Aug. 10, 2007, 28 pages.
Office Action issued in U.S. Appl. No. 10/954,714 on Apr. 2, 2008, 14 pages.
Office Action issued in U.S. Appl. No. 10/954,714 on Dec. 4, 2008, 19 pages.
Office Action issued in U.S. Appl. No. 10/954,714 on Sep. 3, 2009, 24 pages.
Notice of Allowance issued in U.S. Appl. No. 10/954,714 on Jun. 14, 2010, 24 pages.
Notice of Allowance issued in U.S. Appl. No. 10/954,714 on Oct. 18, 2010, 12 pages.
Notice of Allowance issued in U.S. Appl. No. 10/954,714 on Feb. 16, 2011, 23 pages.
Notice of Allowance issued in U.S. Appl. No. 10/954,714 on Jun. 29, 2011, 25 pages.

* cited by examiner

METHODS AND SYSTEMS FOR AUGMENTING A TOKEN LEXICON

CROSS-REFERENCE TO RELATED APPLICATIONS

This application is a continuation of and claims priority under 35 U.S.C. §120 to U.S. application Ser. No. 10/954,714, filed on Sep. 30, 2004, the entire contents of which are hereby incorporated by reference.

FIELD OF THE INVENTION

The present invention relates generally to text segmentation and, more particularly, to methods and systems for augmenting a token lexicon.

BACKGROUND OF THE INVENTION

Text processing methods and systems exist that attempt to interpret data representing text. Text processing is made more difficult when text comprising a string of characters is received that has no breaks indicating words or other tokens. When processing such strings of characters using existing methods and systems, the characters can be segmented into tokens in order to interpret the string. Tokens can be words, acronyms, abbreviations, proper names, geographical names, stock market ticker symbols, or other suitable symbolic expressions. Generally, a string of characters can be segmented into multiple combinations of segmented strings of characters using existing methods and systems. Recognizing tokens can be made more difficult when a string of characters contains misspellings, abbreviations, unusual terms, or proper names.

SUMMARY

Embodiments of the present invention comprise methods and systems for augmenting a token lexicon. One aspect of one embodiment of the present invention comprises identifying a first token from a search request, storing the first token in a lexicon data storage, receiving a character string comprising a second token, wherein the second token is substantially similar to the first token, and parsing the character string using the lexicon data storage to resolve the second token.

According to another embodiment, a method comprises identifying a first token from an internet article, storing the first token in a lexicon data storage, receiving a character string comprising a second token, wherein the second token is substantially similar to the first token, and parsing the character string using the lexicon data storage to resolve the second token.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for augmenting a token lexicon. There are multiple embodiments of the present invention. By way of introduction and example, one exemplary embodiment of the present invention provides a method for adding tokens to a list of tokens such as a lexicon. Tokens can be words, acronyms, abbreviations, proper names, geographical names, stock market ticker symbols, or other suitable symbolic expressions. The additional tokens can come from a search log containing a record of search queries or from other sources such as web pages, instant messaging dialogs, or chat sessions. Using a search log or other unedited sources of tokens can help identify misspellings, abbreviations, or other unusual or unique tokens to add to the lexicon. The lexicon can then be used to better identify tokens within strings containing misspellings, abbreviations, and unusual or unique tokens.

This introduction is given to introduce the reader to the general subject matter of the application. By no means is the invention limited to such subject matter. Exemplary embodiments are described below.

System Architecture

Figure 1:
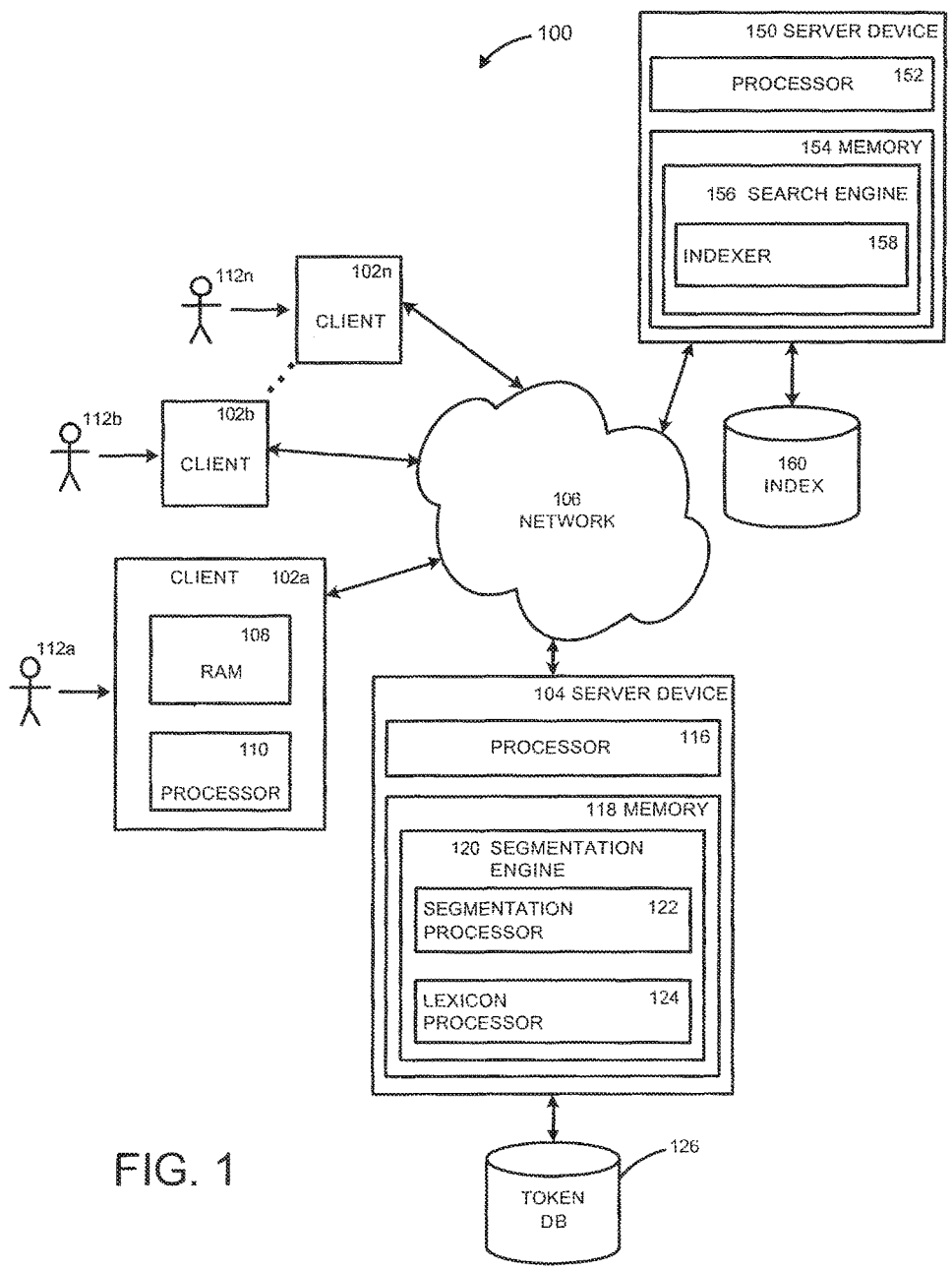
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 and a server device 150 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown in FIG. 1 each comprise a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic™, Java™, Python, Perl, and JavaScript™.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsoft® Windows® or Linux®. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 and a server device 150 are also coupled to the network 106.

The server device 104 can comprise a server executing a segmentation engine application program and server device 150 can comprise a server executing a search engine application program. Similar to the client devices 102a-n, the server device 104 and server device 150 shown in FIG. 1 comprise a processor 116 coupled to a computer-readable memory 118 and a processor 152 coupled to a computer-readable memory 154, respectively. Server devices 104 and 150, depicted as single computer systems, may be implemented as a network of computer processors. Examples of server devices 104, 150 are servers, mainframe computers, networked computers, a processor-based device, and similar types of systems and devices. Client processor 110 and the server processors 116, 152 can be any of a number of computer processors, as described above, such as processors from Intel Corporation of Santa Clara, Calif. and Motorola Corporation of Schaumburg, Ill.

Memory 118 contains a segmentation application program, also known as a segmentation engine 120. The server device 104, or related device, can access the network 106 to receive strings of characters from other devices or systems connected to the network 106. Characters can include, for example, marks or symbols used in a writing system, including data representing a character, such as ASCII, Unicode, ISO 8859-1, Shift-JIS, and EBCDIC or any other suitable character set. In one embodiment, the segmentation engine 120 can receive a string of characters, such as a domain name, from a server device on the network 106 when a user 112a attempts to direct a web browser application to a domain name that is not active.

In one embodiment, the segmentation engine 120 segments the string of characters into potential combinations of tokens and selects a particular combination to associate with the string of characters. A token can comprise a word, a proper name, a geographic name, an abbreviation, an acronym, a stock market ticker symbol, or other suitable symbolic expressions. The segmentation engine 120 can include a segmentation processor 122 and a lexicon processor 124. In the embodiment shown in FIG. 1, each comprises computer code residing in the memory 118.

The segmentation processor 122 can determine a list of potential combinations of tokens or segmented results from the string of characters. In one embodiment, the lexicon processor 124 identifies tokens to add to a lexicon or ontology of tokens. According to one embodiment, the segmentation processor can access likely sources of misspellings, unique or unusual tokens, proper names, and other tokens that may not be a part of an existing lexicon or ontology.

The lexicon processor 124 can add tokens identified by the segmentation processor 122 to a lexicon. A lexicon can comprise, for example, a set of identified tokens that can be stored, for example, in a token database 126 and can be used to help identify possible tokens when parsing new strings of characters. A lexicon can further comprise an ontology, which can comprise, for example, a set of tokens associated with concepts, meanings, and interrelated tokens. For example, a token "baseball" can be associated with the concept of sports and can be further associated with a commonly misspelled form of the word, such as "basebal" for example.

Server device 104 also provides access to other storage elements, such as a token storage element, in the example shown the token database 120. The token database can be used to store tokens and frequency information associated with each token. Data storage elements may include any one or combination of methods for storing data, including without limitation, arrays, hash tables, lists, and pairs. The server device 104 can access other similar types of data storage devices.

The server device 150 can include a server executing a search engine application program, such as the Google™ search engine. In other embodiments, the server device 150 can comprise a related information server or an advertising server. In another embodiment, there can be multiple server devices 150.

Memory 154 contains the search engine application program, also known as a search engine 156. The search engine 156 can locate relevant information from the network 106 in response to a search query from a user 112a and can maintain a search log of search queries. The search engine 156 can provide a search result set to a user 112a or pass a search log of search queries to the segmentation engine 120 via the network 106.

In one embodiment, the server device 150, or related device, has previously performed a crawl of the network 106 to locate articles, such as web pages, stored at other devices or systems coupled to the network 106. Articles include, for example, documents, emails, instant messenger messages, database entries, web pages of various formats, such as HTML, XML, XHTML, Portable Document Format (PDF) files, and media files, such as image files, audio files, and video files, or any other documents or groups of documents or information of any suitable type whatsoever. An indexer 158 can be used to index the articles in memory 154 or on another data storage device, such as an index 160. In one embodiment, there are multiple indexes each containing a portion of the total articles indexed. It should be appreciated that other methods for indexing articles in lieu of or in combination with crawling may be used, such as manual submission.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain method illustrated in FIG. 2.

Process

Various methods in accordance with embodiments of the present invention may be carried out. One exemplary method according to the present invention comprises identifying a first token from a search request, storing the first token in a lexicon data storage, receiving a character string comprising a second token, wherein the second token can be substantially similar to the first token, and parsing the character string using the lexicon data storage to resolve the second token. According to another embodiment the second token can be identical to the first token and can comprise at least one of a misspelled token, a domain name, an abbreviation, and a proper name. According to another embodiment the lexicon can comprise an ontology. According to another embodiment the ontology can comprise a concept associated with the first token and association data indicating an association between the first token and an interrelated token. According to another embodiment the first token can be filtered, which can comprise one or more of identifying a threshold frequency, identifying a minimum number of characters, and restricting to a character set. According to another embodiment the character string can comprise a domain name.

According to another embodiment, a method comprises comprising identifying a first token from an internet article, storing the first token in a lexicon data storage, receiving a character string comprising a second token, wherein the second token can be substantially similar to the first token, parsing the character string using the lexicon data storage to resolve the second token. According to another embodiment the Internet article can comprise one or more of an instant messaging dialog, a chat session, or a web page. According to another embodiment the second token can be identical to the first token and can comprise at least one of a misspelled token, a domain name, an abbreviation, and a proper name. According to another embodiment the lexicon can comprise an ontology. According to another embodiment the ontology can comprise a concept associated with the first token and association data indicating an association between the first token and an interrelated token. According to another embodiment the first token can be filtered, which can comprise one or more of identifying a threshold frequency, identifying a minimum number of characters, and restricting to a character set. According to another embodiment the character string can comprise a domain name.

Figure 2:
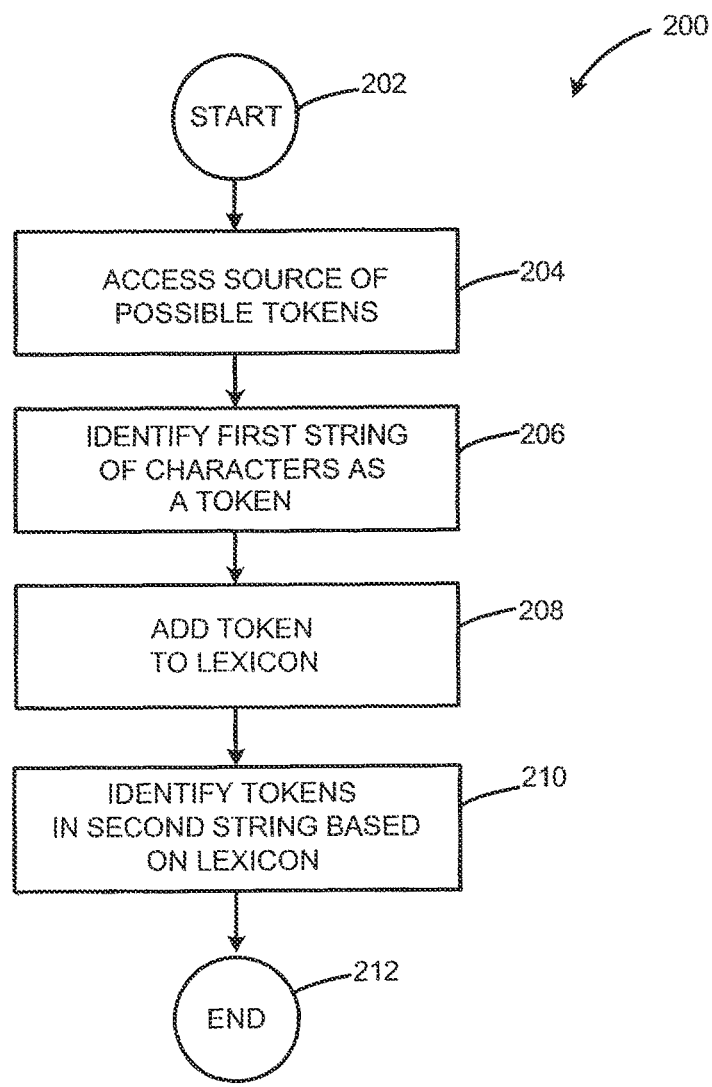
FIG. 2 illustrates a flow diagram of one embodiment of a method carried out by the present invention.

FIG. 2 illustrates an exemplary method 200 for improving text segmentation by identifying tokens from a data source and adding the tokens to a lexicon. This exemplary method is provided by way of example, as there are a variety of ways to carry out methods according to the present invention. The method 200 shown in FIG. 2 can be executed or otherwise performed by one or a combination of various systems. The method 200 is described below as carried out by the system 100 shown in FIG. 1 by way of example, and various elements of the system 100 are referenced in explaining the example method of FIG. 2.

Referring to FIG. 2, in block 202, the example method 200 begins. Following block 202, the method 200 proceeds to block 204, wherein the segmentation processor 122 accesses a source of possible tokens. Accessing a source of possible tokens can comprise, for example, accessing a search log of search queries from the server device 150, accessing articles on the network 106 such as emails, instant messages, web pages, mailing list archives, and other suitable sources of tokens. According to one embodiment, accessing a source of possible tokens can comprise accessing a source likely to contain unedited or unconventional tokens. For example, a search log of search queries can contain search terms that have not been edited for misspellings, etc. The search log can therefore contain a record of misspelled tokens that can be used to supplement a token lexicon. As another example, web pages can contain words, expressions, symbols and terminology unique to an Internet setting that may not be available in traditional lexicons. Also, instant messaging and chat articles can contain proper names and other tokens likely to be unique and thus less likely to appear in traditional lexicons.

Once the segmentation processor 122 accesses a source of possible tokens, the method 200 proceeds to block 206, wherein the segmentation processor 122 identifies a first string within the source of possible tokens as a token. Identifying a first string as a token can comprise, for example, identifying a character such as a space separating tokens within the data source. For example, a search log of search queries can contain the search query "harmon kardon amplifilers." The segmentation processor 122 can identify three separate tokens—"harmon," "kardon," and "amplifilers"—within the search query based on the spacing between the search terms. According to other embodiments, other suitable criteria or delineators can be used to identify tokens within a string of characters. According to one embodiment, a source of pre-segmented text can be used. For example, the search engine 156 can store a history of search queries each of which comprises one or more tokens than can be used by the lexicon processor 124 directly to supplement a token lexicon.

Once the segmentation processor 122 identifies a first string as a possible token, the method 200 proceeds to block 208, wherein the lexicon processor 124 adds the token to a lexicon. Adding the token to a lexicon can comprise, for example, filtering the token and storing the token in a lexicon data storage such as the token database 126. Filtering the token can be used to improve efficiency and can comprise, for example, determining a threshold frequency for the token determining minimum requirements for the token, or using another suitable filtering criterion. For example, a frequency for the token can be determined by identifying how many times the token appears in a sample set of articles on the network 106. To facilitate identifying a frequency for a token, the lexicon processor can access the index 160 attached to the server device 150. According to another embodiment, the lexicon processor can access a separate frequency database or crawl the network to determine a frequency on the fly.

According to another embodiment, filtering based on frequency can comprise determining that a token appears a minimum number of times in a source, such as in a search log, prior to adding the token to a database. Thus, for example, it can be identified that the misspelled token "amplifilers" appears a sufficient number of times in a search log and the token "amplifilers" can then be added to a lexicon.

Filtering tokens based on minimum requirements for a token can comprise, for example, a minimum number of characters or restricting characters to a specific character set.

For example, a minimum requirement can be set that a token contain at least three letters or that a token contain at least one of a certain type of character such as a letter or number, for example. As another example, a requirement can be set that a token comprise characters from a particular character set, such as English letters or symbols for example. According to another embodiment, all tokens can be added to the token database 126 without filtering.

Adding the token to the token database 120 can comprise including the token in a lexicon of tokens. The lexicon of tokens can comprise a simple listing of all tokens or can further contain additional data associated with each token. According to one embodiment, the lexicon can comprise an ontology containing meanings and concepts associated with each token and allowing relationships and associations between tokens to be identified and stored. For example, the ontology can associate tokens comprising misspellings or alternate spellings with a token comprising a correct or preferred spelling. Thus, in the example above where the segmentation processor 122 identifies the tokens "harmon," "kardon," and "amplifilers," the token "amplifilers" can be associated with the correctly spelled token "amplifiers." Additionally, the token "amplifilers" can be associated with concepts associated with the correctly spelled "amplifiers," which can include, for example, consumer electronics, stereo equipment, and music.

In order to identify which correctly spelled token a misspelled token should be associated with, the lexicon processor 124 can utilize a spell checking application program also known as a spell checker. The spell checker can reside in memory 118 on the server device 104 or on another device in communication with the lexicon processor 124.

Once the lexicon processor 124 adds the token to the lexicon, the method 200 proceeds to block 210, wherein the segmentation processor identifies at least one token in a second string based on the tokens in the lexicon. Identifying the token in the second string can comprise, for example, resolving tokens within the second string by identifying tokens that are identical or substantially similar to the tokens in the lexicon. For example, the segmentation processor 122 can receive from the client device 102a a string comprising text, such as a domain name, entered by the user 112a into a URL field of a web browser application. A domain name can comprise an actual domain name that is misspelled, a domain name that cannot be found or does not exist on the network 106, or any other suitable domain name that may or may not be located by a server device. For example, the user 112a can enter the text "hoffmanamplifilers" into the URL field of a web browser application on the client device 102a. The web browser may be unable to resolve the URL request because the URL was misspelled or because it does not exist. The segmentation processor 122 can receive the text "hoffmanamplifilers" from the client device 102a and identify that the tokens "hoffman," and "amplifilers" from the lexicon in the token database 126 are contained in the string "hoffmanamplifilers."

Recognizing the token "amplifilers" can be facilitated by the earlier addition of the token "amplifilers" to the lexicon. For example, a search log can indicate that users on the network 106 commonly misspell the term "amplifiers." The search log can indicate that "amplifilers," for example, is a common misspelling of "amplifiers" and the token "amplifilers" can be added to the lexicon. Once the token is added, the text "hoffmanamplifilers" can be entered by the user 112a as a URL. The URL string "hoffmanamplifilers" can be separated based in part on identifying the token "amplifilers" that was added to the lexicon from the search log and then parsing the remaining portion of the string into the token "hoffman."

According to some embodiments, the segmentation processor can then associate the token "amplifilers" with the correctly spelled "amplifiers" and use the correctly spelled token "amplifiers" together with "hoffman" to identify an existing web page likely to be responsive to the URL the user 112a attempted to access, even though the terms "hoffman amplifiers" may not have explicitly appeared together in a previous search query, based on correctly identifying the token "amplifiers" from the misspelled token "amplifilers" and parsing the remaining token "hoffman."

According to other embodiments, the segmentation processor 122 can receive the second string from the server device 150, over the network 106, or from another suitable source of data to be parsed based on the tokens in the lexicon in the token database 126. Once the segmentation processor 122 identifies tokens in a second string based on the lexicon, the method 200 proceeds to block 212, wherein the exemplary method 200 ends.

GENERAL

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A computer-implemented method comprising:
receiving a first string of characters comprising a plurality of tokens;
tokenizing the first string of characters to identify a candidate token;
determining that the candidate token does not occur in a token lexicon;
in response to determining that the candidate token does not occur in the token lexicon, identifying a particular token that corresponds to the candidate token based on the candidate token being identified as a misspelling of the particular token;
identifying a concept that is a category that represents characteristics of tokens with which it is associated and that is associated in the token lexicon with the particular token that is identified as corresponding to the candidate token based on the candidate token being identified as a misspelling of the particular token;
adding the candidate token to the token lexicon;
associating, in the token lexicon, the candidate token with the concept with which the particular token, identified as corresponding to the candidate token based on the candidate token being identified as a misspelling of the particular token, is associated;
segmenting, using the token lexicon, an additional string of characters comprising a plurality of tokens that includes the candidate token that is identified as a misspelling of the particular token;
receiving a second string of characters;
identifying a substring of the characters in the second string that matches the candidate token;
determining that the second string of characters comprises a first uniform resource locator; and
determining that a URL request for the first uniform resource locator does not identify a server that hosts a resource for the first uniform resource locator, wherein identifying the substring of the characters in the second string that matches the candidate token is based on determining that the URL request for the first uniform resource locator does not resolve.

2. The computer-implemented method of claim 1, further comprising:
   receiving the particular token;
   identifying a frequency of the particular token in a corpus;
   determining that the frequency satisfies a threshold frequency; and
   identifying the particular token as a preferred substitute for the token lexicon based on determining that the frequency is not less than the threshold frequency.

3. The computer-implemented method of claim 1, wherein associating, in the token lexicon, the candidate token with the concept comprises:
   identifying a frequency of the candidate token in a corpus;
   determining that the frequency is not less than a threshold frequency; and
   associating the candidate token with the concept with which the particular token is associated.

4. The computer-implemented method of claim 1, further comprising:
   generating, based on receiving the second string of characters, a search query that includes the particular token as a substitute for the candidate token.

5. The computer-implemented method of claim 4, wherein generating the search query that includes the particular token as a substitute for the candidate token comprises generating a second uniform resource locator that includes the particular token and does not include the candidate token.

6. The computer-implemented method of claim 1, wherein adding the candidate token to the token lexicon comprises:
   identifying the candidate token in one or more logs associated with multiple previously received search requests;
   determining a frequency with which the candidate token appears in the one or more logs;
   determining whether the determined frequency with which the candidate token appears in the one or more logs satisfies a threshold; and
   storing the candidate token in the token lexicon based on the determination of whether the determined frequency with which the identified first token appears in the one or more logs satisfies the threshold.

7. A system comprising:
   a user device and one or more storage devices storing instructions that are configured, when executed by the user device, to cause the user device to perform operations comprising:
   receiving a first string of characters comprising a plurality of tokens;
   tokenizing the first string of characters to identify a candidate token;
   determining that the candidate token does not occur in a token lexicon;
   in response to determining that the candidate token does not occur in the token lexicon, identifying a particular token that corresponds to the candidate token based on the candidate token being identified as a misspelling of the particular token;
   identifying a concept that is a category that represents characteristics of tokens with which it is associated and that is associated in the token lexicon with the particular token that is identified as corresponding to the candidate token based on the candidate token being identified as a misspelling of the particular token;
   adding the candidate token to the token lexicon;
   associating, in the token lexicon, the candidate token with the concept with which the particular token, identified as corresponding to the candidate token based on the candidate token being identified as a misspelling of the particular token, is associated;
   segmenting, using the token lexicon, an additional string of characters comprising a plurality of tokens that includes the candidate token that is identified as a misspelling of the particular token;
   receiving a second string of characters;
   identifying a substring of the characters in the second string that matches the candidate token;
   determining that the second string of characters comprises a first uniform resource locator; and
   determining that a URL request for the first uniform resource locator does not identify a server that hosts a resource for the first uniform resource locator, wherein identifying the substring of the characters in the second string that matches the candidate token is based on determining that the URL request for the first uniform resource locator does not resolve.

8. The system of claim 7, the operations further comprising:
   receiving the particular token;
   identifying a frequency of the particular token in a corpus;
   determining that the frequency satisfies a threshold frequency; and
   identifying the particular token as a preferred substitute for the token lexicon based on determining that the frequency is not less than the threshold frequency.

9. The system of claim 7, wherein associating, in the token lexicon, the candidate token with the concept comprises:
   identifying a frequency of the candidate token in a corpus;
   determining that the frequency is not less than a threshold frequency; and
   associating the candidate token with the concept with which the particular token is associated.

10. The system of claim 7, the operations further comprising:
    generating, based on receiving the second string of characters, a search query that includes the particular token as a substitute for the candidate token.

11. The system of claim 10, wherein generating the search query that includes the particular token as a substitute for the candidate token comprises generating a second uniform resource locator that includes the particular token and does not include the candidate token.

12. The system of claim 7, wherein adding the candidate token to the token lexicon comprises:
    identifying the candidate token in one or more logs associated with multiple previously received search requests;
    determining a frequency with which the candidate token appears in the one or more logs;
    determining whether the determined frequency with which the candidate token appears in the one or more logs satisfies a threshold; and
    storing the candidate token in the token lexicon based on the determination of whether the determined frequency with which the identified first token appears in the one or more logs satisfies the threshold.

13. A non-transitory computer storage medium encoded with instructions that, when executed by a user device, cause the user device to perform operations comprising:
    receiving a first string of characters comprising a plurality of tokens;
    tokenizing the first string of characters to identify a candidate token;
    determining that the candidate token does not occur in a token lexicon;
    in response to determining that the candidate token does not occur in the token lexicon, identifying a particular token that corresponds to the candidate token based on the candidate token being identified as a misspelling of the particular token;
    identifying a concept that is a category that represents characteristics of tokens with which it is associated and that is associated in the token lexicon with the particular token that is identified as corresponding to the candidate token based on the candidate token being identified as a misspelling of the particular token;
    adding the candidate token to the token lexicon;
    associating, in the token lexicon, the candidate token with the concept with which the particular token, identified as corresponding to the candidate token based on the candidate token being identified as a misspelling of the particular token, is associated;
    segmenting, using the token lexicon, an additional string of characters comprising a plurality of tokens that includes the candidate token that is identified as a misspelling of the particular token;
    receiving a second string of characters;
    identifying a substring of the characters in the second string that matches the candidate token;
    determining that the second string of characters comprises a first uniform resource locator; and
    determining that a URL request for the first uniform resource locator does not identify a server that hosts a resource for the first uniform resource locator, wherein identifying the substring of the characters in the second string that matches the candidate token is based on determining that the URL request for the first uniform resource locator does not resolve.

14. The non-transitory computer storage medium of claim 13, the operations further comprising:
    receiving the particular token;
    identifying a frequency of the particular token in a corpus;
    determining that the frequency satisfies a threshold frequency; and
    identifying the particular token as a preferred substitute for the token lexicon based on determining that the frequency is not less than the threshold frequency.

15. The non-transitory computer storage medium of claim 13, wherein associating, in the token lexicon, the candidate token with the concept comprises:
    identifying a frequency of the candidate token in a corpus;
    determining that the frequency is not less than a threshold frequency; and
    associating the candidate token with the concept with which the particular token is associated.

16. The non-transitory computer storage medium of claim 13, the operations further comprising:
    generating, based on receiving the second string of characters, a search query that includes the particular token as a substitute for the candidate token.

17. The non-transitory computer storage medium of claim 16, wherein generating the search query that includes the particular token as a substitute for the candidate token comprises generating a second uniform resource locator that includes the particular token and does not include the candidate token.

18. The non-transitory computer storage medium of claim 13, wherein adding the candidate token to the token lexicon comprises:
    identifying the candidate token in one or more logs associated with multiple previously received search requests;
    determining a frequency with which the candidate token appears in the one or more logs;
    determining whether the determined frequency with which the candidate token appears in the one or more logs satisfies a threshold; and
    storing the candidate token in the token lexicon based on the determination of whether the determined frequency with which the identified first token appears in the one or more logs satisfies the threshold.

19. A computer-implemented method comprising:
    receiving a string of characters that includes a first substring and a second substring as part of a first uniform resource locator;
    determining that a URL request for the first uniform resource locator does not identify a server that hosts a resource for the first uniform resource locator;
    determining that the first substring of the characters is not included in a particular lexicon;
    in response to determining that the first substring is not included in a particular lexicon, identifying a first token that is included in the particular lexicon as a preferred substitute of the first substring;
    identifying a concept that is a category that represents characteristics of tokens with which it is associated and that is associated in the particular lexicon with the first token that is identified as a preferred substitute of the first substring;
    adding the first substring of the characters to the particular lexicon;
    associating, in the particular lexicon, the first substring of the characters with the concept with which the first token that is identified as a preferred substitute of the first substring is associated;
    generating, based on receiving the string of characters, a second uniform resource locator from the first token, included in the particular lexicon as a preferred substitute of the first substring, and the second substring that is part of the first uniform resource locator, and that does not include the first substring of the characters, wherein the second uniform resource locator does not include whitespace between the first token and the second substring; and
    providing the second uniform resource locator.

20. The computer-implemented method of claim 19, wherein the first substring of the characters comprises a misspelling of the first token.

* * * * *